No. 643,256. Patented Feb. 13, 1900.
G. F. SIMPSON.
ACETYLENE GAS GENERATOR.
(Application filed Feb. 7, 1899.)
(No Model.) 4 Sheets—Sheet 1.

WITNESSES:

INVENTOR
George Frederic Simpson
BY
Robert Brien Monroe
ATTORNEY

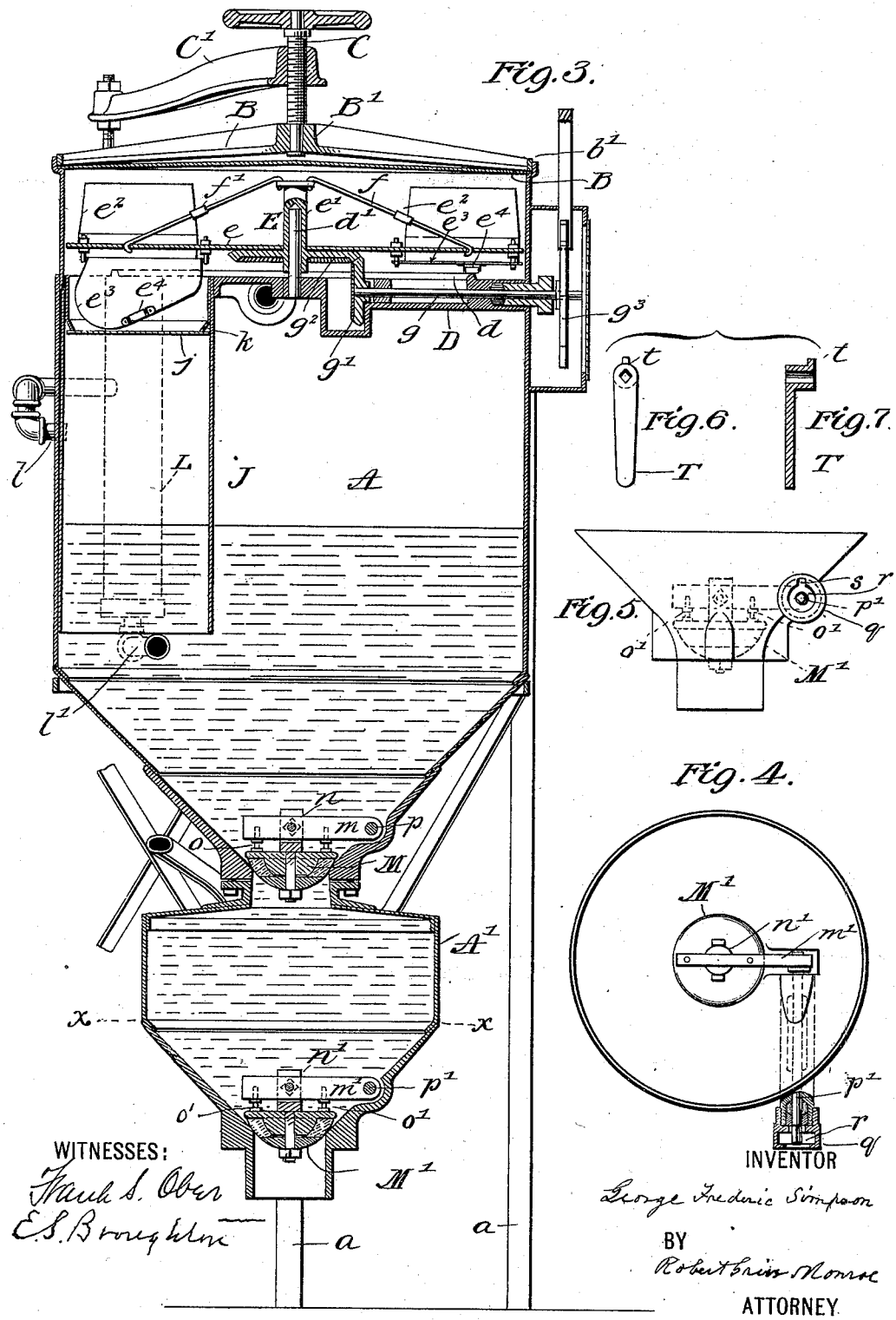

No. 643,256. Patented Feb. 13, 1900.
G. F. SIMPSON.
ACETYLENE GAS GENERATOR.
(Application filed Feb. 7, 1899.)
(No Model.) 4 Sheets—Sheet 4.
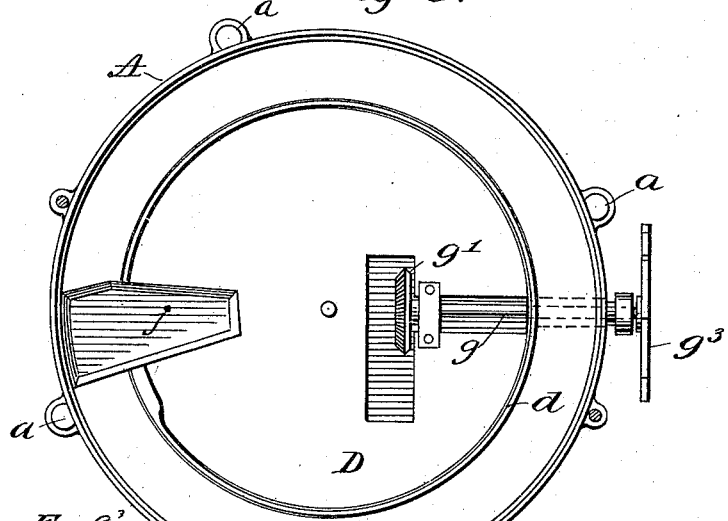
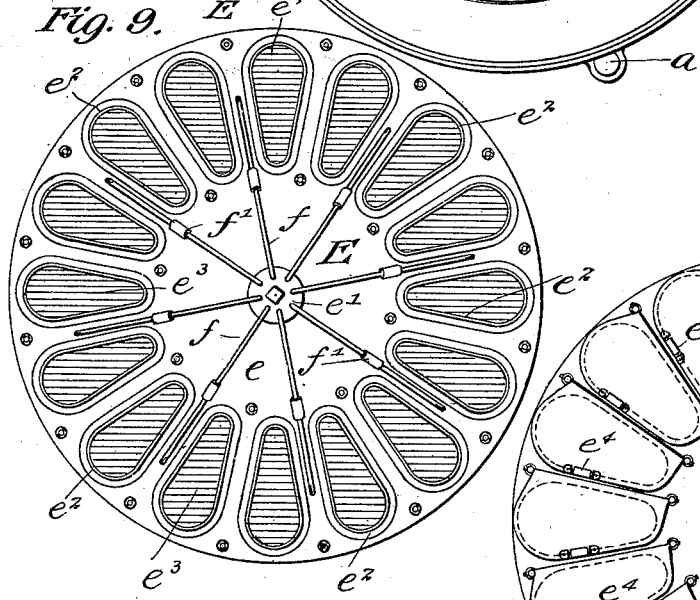
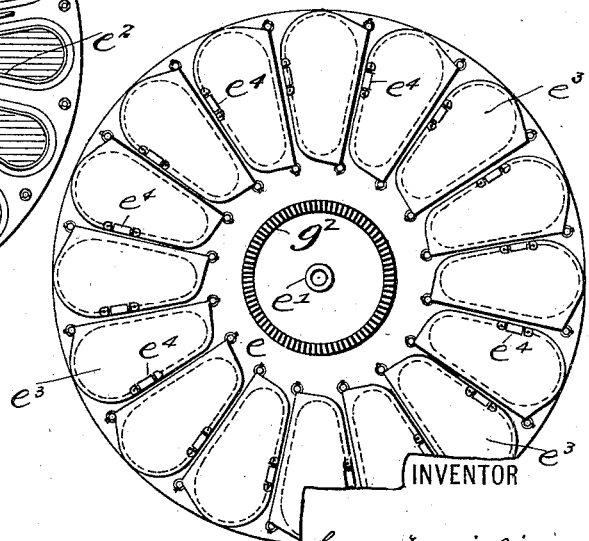
WITNESSES:
INVENTOR
George Frederic Simpson
BY
Robert Grain Monroe
ATTORNEY

UNITED STATES PATENT OFFICE.

GEORGE FREDERIC SIMPSON, OF NEW YORK, N. Y., ASSIGNOR TO THE SOLAR GAS AND MACHINE COMPANY, OF VIRGINIA.

ACETYLENE-GAS GENERATOR.

SPECIFICATION forming part of Letters Patent No. 643,256, dated February 13, 1900.

Application filed February 7, 1899. Serial No. 704,704. (No model.)

*To all whom it may concern:*

Be it known that I, GEORGE FREDERIC SIMPSON, a citizen of the United States, residing at New York, in the borough of Manhattan, county of New York, and State of New York, have invented certain new and useful Improvements in Acetylene-Gas Generators, of which the following is such a full, clear, and exact description as will enable others skilled in the art to which my invention appertains to make and use the same, reference being had to the accompanying drawings, forming part of this application.

My invention relates to that class of generators in which definite quantities of carbid are automatically precipitated into a volume of water at predetermined intervals, the carbid-holder being operated by the movement of the bell of the gasometer and the gas formed as used.

Gas-generating apparatus heretofore constructed, while theoretically efficient, have developed many defects in practical use.

The object of my invention is to overcome these defects and produce a generator certain in mechanical operation, compact in form, in which the carbid can be safely stored until used, and one which can be recharged, cleaned, and flushed by an untrained operator without danger of accident or explosion.

Figure 1:
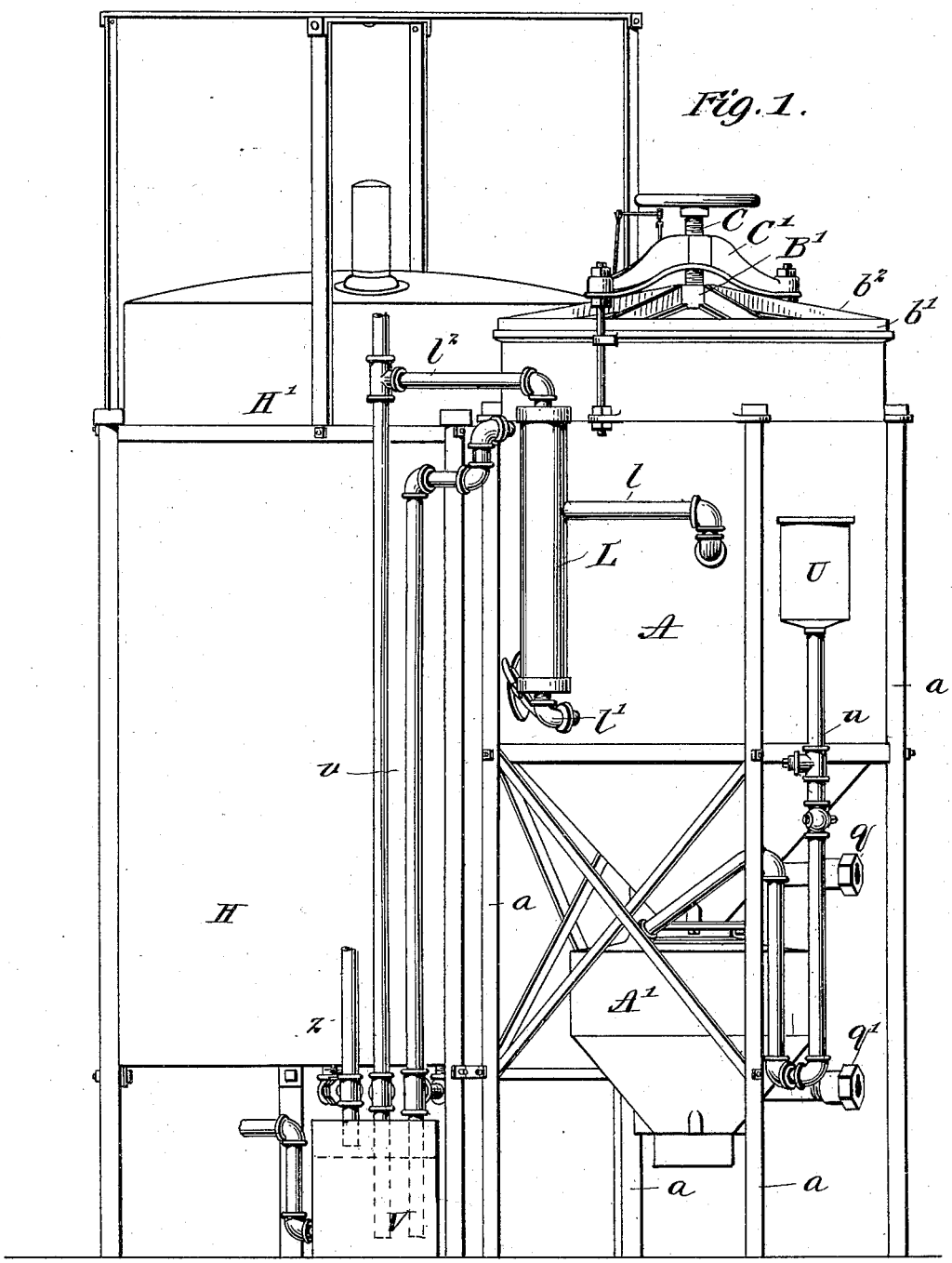
Figure 2:
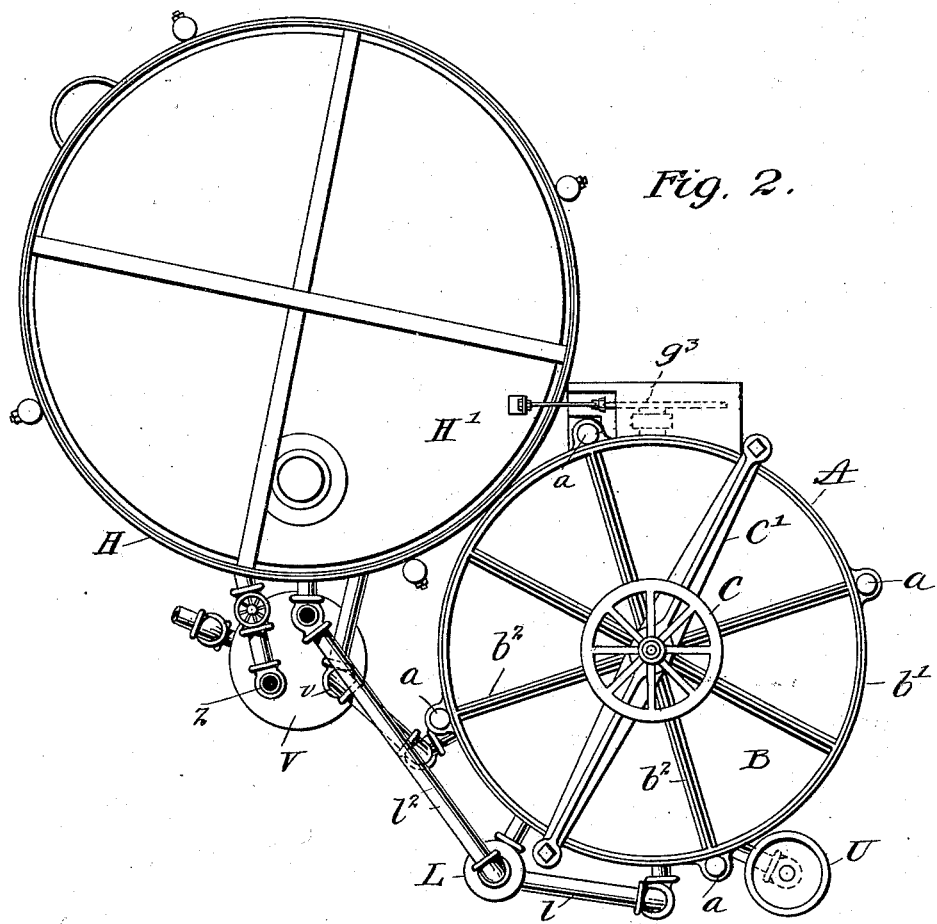
Figure 11:
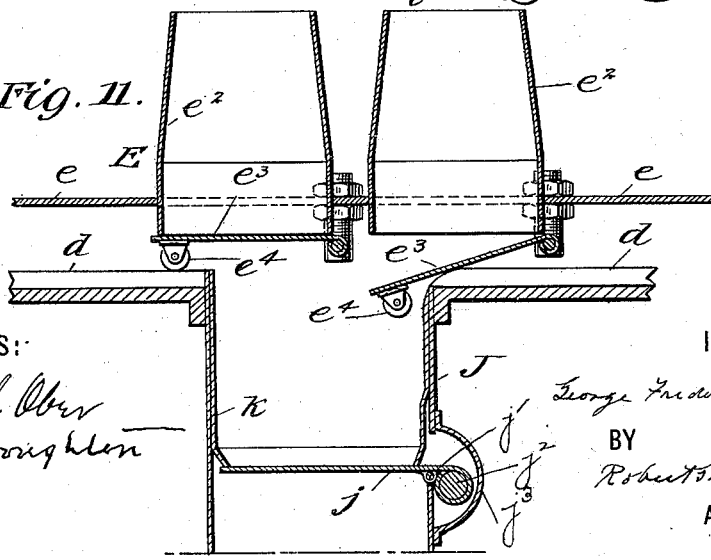

In the accompanying drawings, Figure 1 is a view in elevation, showing general arrangement of generator and gasometer with connecting-pipes; and Fig. 2 is a plan view of the same. Fig. 3 is a central vertical sectional view of generator embodying my improvements. Fig. 4 is a cross-section on the line $x\,x$ of Fig. 3, showing top of valve and also showing in section the sleeve surrounding the end of the operating-shaft. Fig. 5 is an end view of shaft and sleeve, also showing valve in dotted lines. Figs. 6 and 7 are respectively sectional and plan views of crank-handle. Fig. 8 is a plan view of dividing-plate upon which the carbid-holder rests. Fig. 9 is a plan view of carbid-holder looking from above, and Fig. 10 is a plan view of the same looking from below. Fig. 11 is a detailed sectional view of carbid-pockets and upper end of carbid-chute.

The generating vessel A, with lower refuse-receptacle A', is shown as supported on uprights $a\,a$ and is in the form of a cylinder with a funnel-shaped or conical base or bottom. About the upper edge of this cylinder is a circular recess, in which may be fitted a rubber gasket and upon which rests the thin metal lid or cover B, held down by the clamp B'. The clamp B', which has a circular rim $b'$ and radiating spokes $b^2\,b^2$, is raised and lowered by the screw C, mounted on the cross-bar C', thus permitting the movable lid to be readily withdrawn for the purpose of recharging, and when restored and pressed down making a gas-tight joint. Within the cylinder and near its upper end is a dividing-plate D, with circular track $d$ and recess for receiving the gear-wheel, and mounted in the center of this plate is a pivot or pin $d'$, upon which revolves the carbid-holder E. The holder E consists of a circular plate or pan $e$, secured to a central hollow shaft $e'$, bored out to receive the pin $d'$ and provided with a series of segmental pockets or carbid-boxes $e^2\,e^2$ with swinging bottoms $e^3\,e^3$ and rollers $e^4\,e^4$. Guy-rods $f\,f$, with adjusting-screws $f'\,f'$, support the plate $e$ and prevent sagging, maintaining the rollers on an even plane, so that they run smoothly on the circular track as the carbid-holder is rotated by the shaft $g$ and beveled gearing $g'\,g^2$. At the outer end of the shaft $g$ are a ratchet-wheel $g^3$ and intermediary connections with the bell H' of the gasometer H, such as the arm $g^4$ and pawl $g^5$, whereby the carbid-holder is operated by the movement of the bell, as has previously been done in apparatus of this description.

At one side of the dividing-plate D is an opening, from which leads the carbid-chute J. This chute extends downward sufficiently below the water-line in the generating-chamber to prevent a backward flow of gas, while the shutter $j$, hinged at $j'$ and weighted at $j^2$, checks the rise of gas generated in the chute itself and also prevents any water from splashing up into the upper compartment in which the carbid-holder is located. It will be noticed (see Fig. 11) that the shutter $j$, its hinge, and overbalancing-weight $j^2$ are entirely inclosed in the chute, a hood $j^3$ being attached to the chute for this purpose. The result is that no escape of gas is possible at this point, as is the case where the shutter and hinge are not entirely inclosed. The weight closes the shutter automatically when it has discharged its load. At the upper end of this chute is also preferably arranged, as shown in detail in Fig. 11, an inner sleeve or lining $k$, with lower edges bent in to afford a bearing against which the shutter rests and avoid clogging as the carbid is precipitated down the chute. To carry off gas from the chute, an open pipe $l$ leads to what I term a "separator" L, which is merely a cylinder which is connected at its lower end with the generating-chamber by the pipe $l'$ and is provided at its upper end with an outlet-pipe $l^2$. The lower opening from the cylinder A to the receptacle A' and the drainage-opening from the said receptacle are both closed by similarly-operated spherical valves M M', which valves are preferably formed of iron, with an intermediary rim or section of rubber, and are secured to the lever-arms $m$ $m'$ by the bars $n$ $n'$ and adjusting-screws $o$ $o$ and $o'$ $o'$, thus providing valves of positive action which can be fitted exactly to their seats. The outer ends of the shafts $p$ $p'$ by which the valves are raised and lowered are surrounded by screw caps or sleeves $q$ $q'$, Fig. 1, each provided with a hollow head $r$ and a slot or opening $s$ leading thereinto, all as fully illustrated in Figs. 4 and 5. These shafts are operated by detachable crank arm or handle T, which, as shown in Fig. 9, is formed with a projection or button $t$, adapted to enter the openings $s$ $s$ and move in the grooves $r$ $r$, thus permitting the head of the crank-arm to be inserted and turned within the sleeve, but not permitting the crank-handle's withdrawal except at the same angle at which it entered.

To operate the machine, the valve M, which closes the outlet at the lower end of the generator, is raised and water is introduced through the funnel U or directly by hydrant connection with the pipe $u$ until it fills the receptacle A' and rises in the generator A a short distance above the lower end of the carbid-chute. The circular clamp B' is then raised, the thin lid B removed, and the boxes or pockets in the holder filled with carbid, the open spaces between the radiating ribs of the circular clamp affording ample room for this purpose. The thin cover or lid is then slipped back into place and the clamp screwed tightly down. All the carbid-pockets can be filled at once except the one directly over the opening above the chute, and a measured amount of carbid may be dropped through this pocket into the chute and bearing down the shutter fall into the water in the generating-chamber and formation of the gas commence at once. As the newly-formed gas rises it is led off by the pipe $v$ to the separating vessel V and thence to the gasometer H, where it is cooled by the water therein, and subsequently passing upward through a strainer enters the bell H', raising the same. The vessel V is merely a drip-box of the form shown by dotted lines, Fig. 1. The strainer here referred to is of the usual form in such devices and need not be here specially described or illustrated. As the gas is drawn off for use through the supply-pipe $z$ the bell drops and partially turns the ratchet-wheel $g^3$, giving a corresponding rotation to the carbid-holder and bringing another pocket over the opening in the plate D to precipitate its contents through the chute.

When it becomes necessary to flush the machine and draw off the deposit or refuse, the valve M is restored to its seat and the handle T withdrawn. The head of the handle is then inserted within the sleeve and about the head of the shaft $p'$ and the valve M' raised and held open until all the water in the lower receptacle has run out. The valve is then restored to its seat, the wrench-handle withdrawn, and the upper valve again raised. The upper valve may then be closed and the operation repeated. Each time, however, only a predetermined amount of water is withdrawn, and the generator can thus be flushed when in operation without danger of a valve being held open too long or left open and all the water carried off.

Having fully described my invention, what I claim as new, and desire to secure by Letters Patent, is—

1. In an acetylene-gas apparatus the combination of a cylinder, a removable lid therefor, an inner dividing-plate formed with an opening, a chute leading from said opening to below the water-line in the generating-chamber, a shutter hinged and weighted to swing within the chute and close the same, a hood or cover attached to the chute, said shutter and weight being entirely inclosed within the chute and hood, a circular carbid-holder provided with segmental pockets having swinging bottoms and arranged within said cylinder and above said dividing-plate and means for rotating said carbid-holder substantially as and for the purposes set forth.

2. In an acetylene-gas apparatus the combination of a cylinder, a removable lid therefor, an inner dividing-plate formed with an opening, a chute leading from said opening to below the water-line in the generating-chamber, a shutter hinged and weighted to swing within said chute and close the same, a separator provided with an escape-pipe, a pipe leading to the generating-chamber below the water-line and a pipe leading from the chute above the water-line therein, a circular carbid-holder provided with segmental pockets and swinging bottom and arranged within said cylinder and above said dividing-plate and means for rotating said carbid-holder substantially as and for the purposes set forth.

3. In an acetylene-gas apparatus the combination of a cylinder, a removable lid therefor, a circular clamp formed with a rim and radiating ribs, a screw adapted to raise and lower said clamp and permit the removal of said lid, an inner dividing-plate provided with an opening, a chute leading from said opening to below the water-line in the generating-chamber, an inner sleeve or lining arranged within the upper end of said chute, a shutter hinged within the same and adapted to bear against the lower edges of said lining, a circular carbid-holder provided with segmental pockets having swinging bottoms and arranged within said cylinder and above said dividing-plate and means for rotating said carbid-holder substantially as and for the purposes set forth.

4. In an acetylene-gas apparatus the combination of a generating-cylinder, a lower refuse-receptacle with drainage-outlet, said cylinder being formed with a conical base and opening leading to said receptacle, a valve adapted to close said opening, means for raising said valve and preventing the removal of the operating-handle until lowered and a similarly-operated valve arranged to close the drainage-outlet of the refuse-receptacle substantially as described.

5. In an acetylene-gas apparatus the combination of a generating-cylinder, a lower refuse-receptacle with drainage-outlet, said cylinder being formed with a conical base and opening leading to said receptacle, a shaft extending within said cylinder, a valve mounted on said shaft and adapted to close said opening, the outer end of said shaft being surrounded with a sleeve having a circular recess and opening thereto substantially as and for the purpose set forth.

6. In an acetylene-gas apparatus the combination of a generating-cylinder provided with a lower opening, a valve adapted to close said opening, a shaft extending within said cylinder, a lever-arm mounted on the inner end of said shaft, a bolt and adjusting-screws connecting said valve with said arm, and a sleeve surrounding the outer end of said shaft formed with a circular recess and opening thereto substantially as and for the purpose set forth.

In testimony whereof I have affixed my signature in the presence of two witnesses.

GEORGE FREDERIC SIMPSON.

Witnesses:
J. S. CHARLESON,
R. G. MONROE.